(12) United States Patent
Ko et al.

(10) Patent No.: US 11,480,693 B2
(45) Date of Patent: Oct. 25, 2022

(54) BILLING SYSTEM BASED ON RADON CONCENTRATION PATTERN ANALYSIS AND METHOD THEREFOR

(71) Applicant: FTLAB co., LTD., Ansan-si (KR)

(72) Inventors: Jae-Jun Ko, Seoul (KR); Young-Gweon Kim, Anyang-si (KR)

(73) Assignee: FTLAB CO., LTD., Ansan-si (KR)

( * ) Notice: Subject to any disclaimer, the term of this patent is extended or adjusted under 35 U.S.C. 154(b) by 129 days.

(21) Appl. No.: 16/674,649

(22) Filed: Nov. 5, 2019

(65) Prior Publication Data
US 2021/0088675 A1     Mar. 25, 2021

(51) Int. Cl.
*G06Q 30/04* (2012.01)
*G01T 1/178* (2006.01)
*G06Q 30/06* (2012.01)

(52) U.S. Cl.
CPC ............. *G01T 1/178* (2013.01); *G06Q 30/04* (2013.01); *G06Q 30/0645* (2013.01)

(58) Field of Classification Search
CPC ........................... G06Q 30/04; G06Q 30/0645
USPC .............................................................. 705/34
See application file for complete search history.

(56) References Cited

U.S. PATENT DOCUMENTS

| 7,414,525 B2 * | 8/2008 | Costea ................ G05B 23/0256 340/514 |
| 2020/0378938 A1 * | 12/2020 | Lee .......................... G01W 1/02 |

FOREIGN PATENT DOCUMENTS

| KR | 1020110102953 A | 9/2011 |
| KR | 1020170023601 A | 3/2017 |
| KR | 101912680 B1 * | 10/2018 |
| KR | 101912680 B1 | 10/2018 |

OTHER PUBLICATIONS

Blog posting by MUTJIMKICKBOXINGMUAYTHAI, "Sesco Air Purifier", https://blog.naver.com/gjdudxo214/221498595191, Mar. 27, 2019, KR.

* cited by examiner

*Primary Examiner* — Rokib Masud
(74) *Attorney, Agent, or Firm* — ArentFox Schiff LLP

(57) ABSTRACT

A billing system based on radon concentration pattern analysis and a method therefor is provided, the system including a radon detection device counting the output alpha particle detection signals for a predetermined measurement time to calculate a radon concentration value; and a cloud server storing generating a radon concentration pattern corresponding to the radon detection device by using a radon concentration value received from the radon detection device and calculating a cost for radon monitoring service provided to a terminal of the user, wherein the cloud server analyzes the generated radon concentration pattern and determines the periodic behavior pattern of the user for a predetermined period of time, whereby it is possible to charge a radon monitoring service fee for each user using the radon monitoring service, and the user may be motivated to frequently perform the ventilation action that reduces the radon concentration.

15 Claims, 10 Drawing Sheets

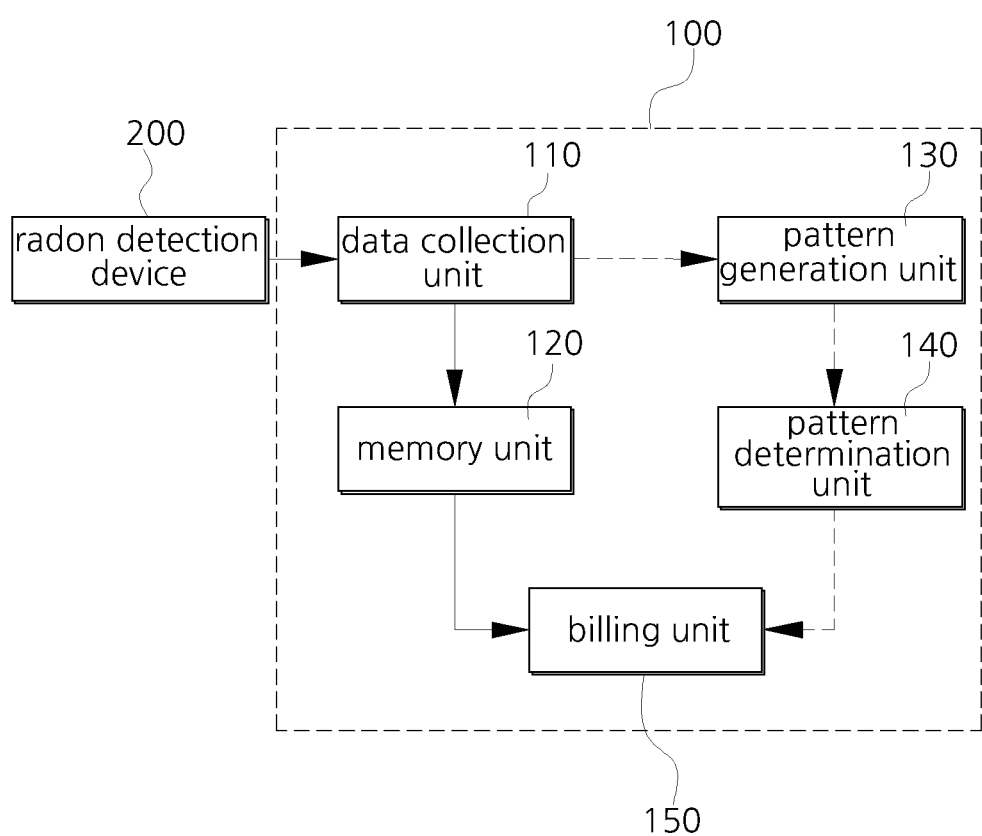

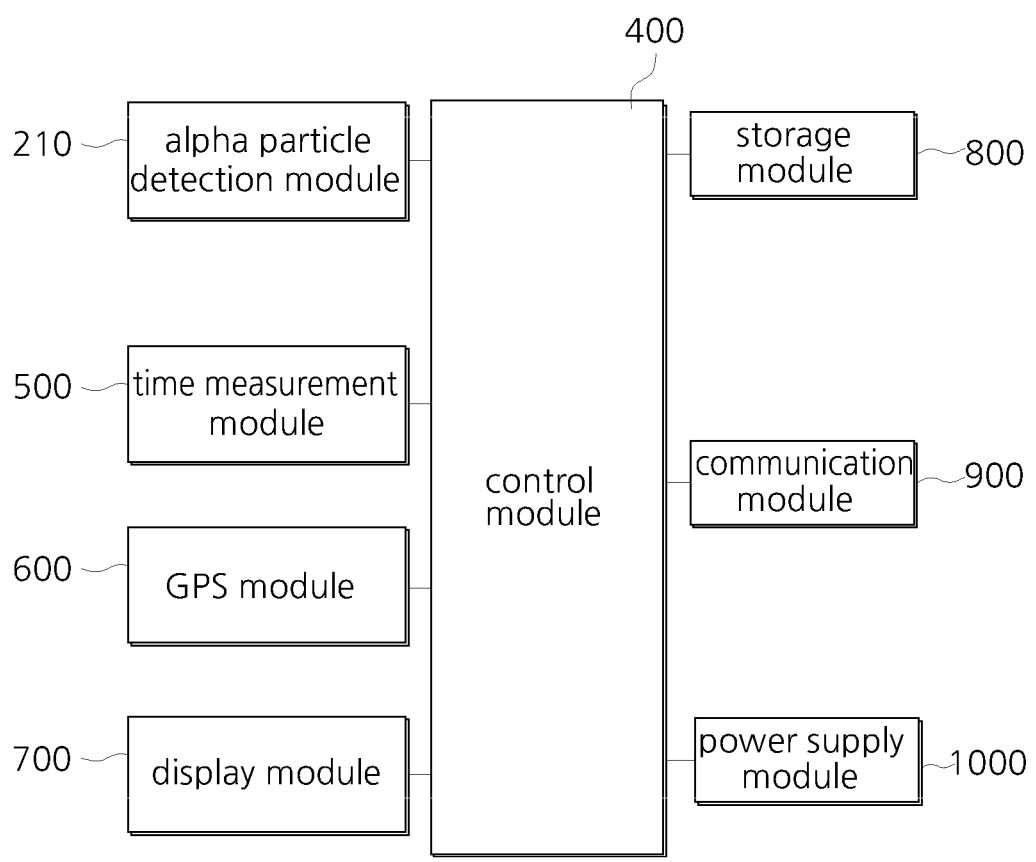

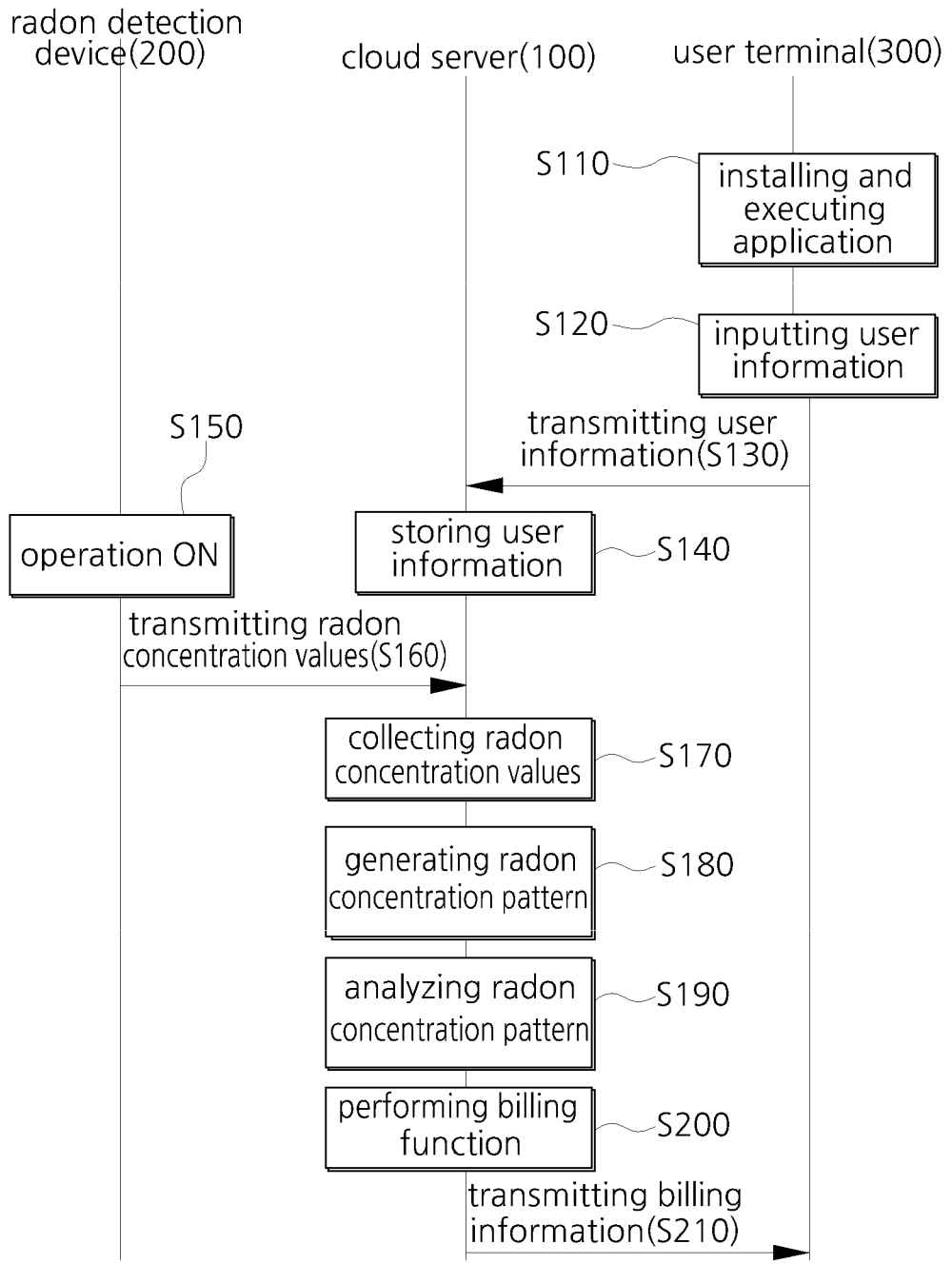

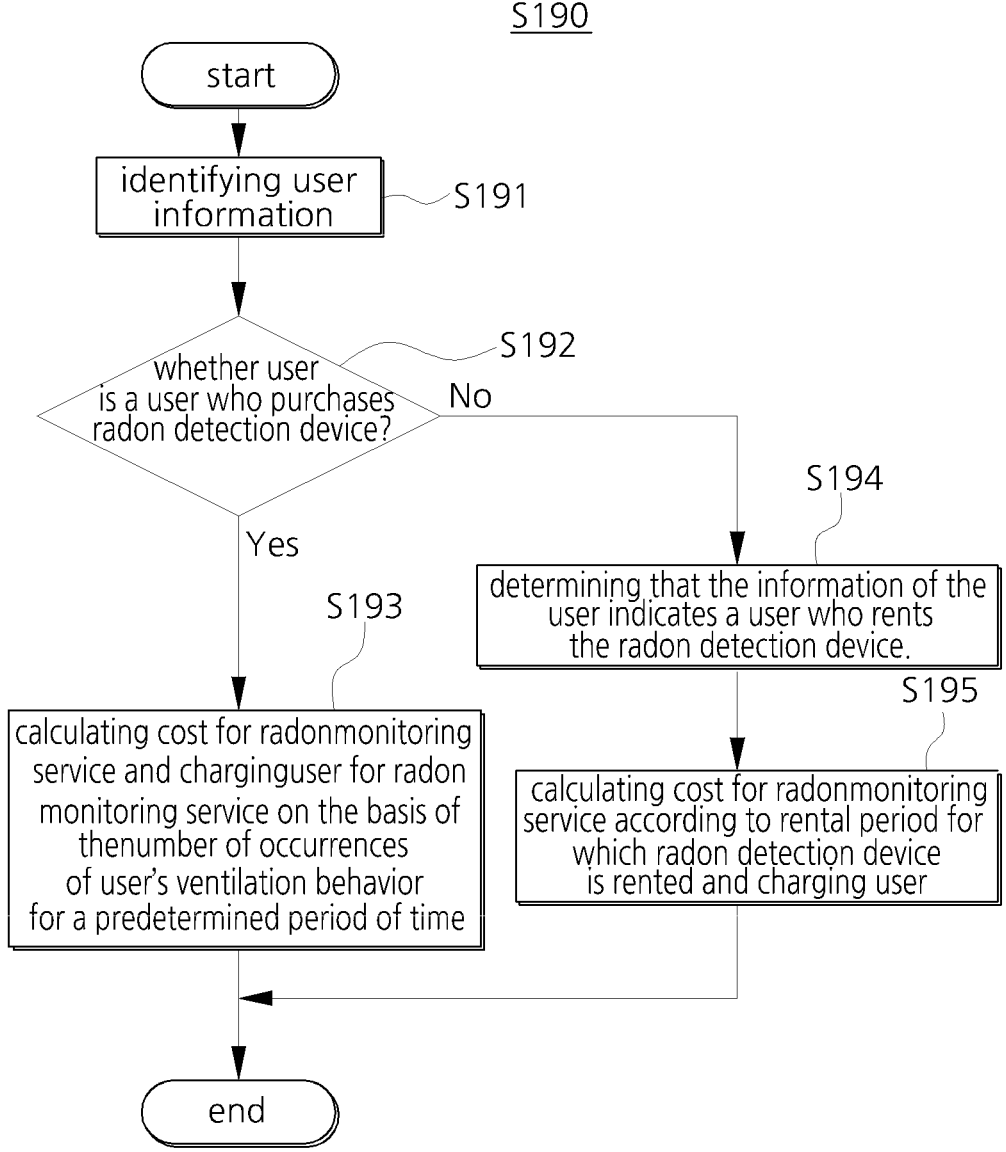

BILLING SYSTEM BASED ON RADON CONCENTRATION PATTERN ANALYSIS AND METHOD THEREFOR

CROSS REFERENCE TO RELATED APPLICATION

This application claims the benefit of priority of Korean Patent Application No. 10-2019-0117261, filed on Sep. 24, 2019, the contents of which is incorporated herein by reference.

BACKGROUND OF THE INVENTION

Field of the Invention

The present invention relates to a billing system based on radon concentration pattern analysis and a method therefor and, more particularly, to a billing system and method that causes a radon monitoring service fee to be charged to a user who uses the radon monitoring service through a pattern analysis on the concentration of radon (Rn), which is a kind of radiation gas contained in the air.

Description of the Related Art

In general, radon (Rn) is a kind of radioactive gas that causes alpha decay with a half-life of 3.8 days. As the US Environmental Protection Agency (EPA) warns that inhalation of radon is the main cause of lung cancer after smoking, and the World Health Organization (WHO) defines that 6-15% of all lung cancer patients have cancer caused by radon, radon is a first-class carcinogen that is very dangerous to the human body.

Since radon has the heaviest gaseous properties on earth, when radon enters the room, it accumulates rather than escapes. Through human breathing, radon enters the lungs and collapses, whereby alpha radiation is released. The alpha radiation is a helium nucleus that has a weaker permeability but has a relatively larger mass than beta or gamma rays, which causes destruction of lung cells. In addition, radon is a colorless, odorless, and tasteless gas, so there is a big problem that people cannot recognize radon even at high indoor concentrations.

As described above, radon gas that is very harmful to the human body is constantly moving to the ground through soil or gravels surrounding a building, and penetrates into the room through the empty spaces of the building or pores of concrete. As such, it is known that radon penetrating from the surrounding soil is a major cause of indoor radon, and construction materials such as concrete, gypsum board, gravel, and brick also become concentration sources of indoor radon.

As described above, in order to accurately evaluate the indoor concentration of radon having a great influence on the health of the human body, various types of measuring instruments and various measurement methods and devices have been developed and used.

Since various types of measuring instruments and various measuring methods and devices developed in the past have problems that there is an instability, such as electrical stability, noise, error correction due to external environmental factors; the sensitivity is very low; it takes a very long time to measure radon; and the price is very expensive, thus it is unreasonable to use the same to accurately monitor radon concentration in all indoor places where people live and work, such as homes and multi-use facilities, schools, offices.

As seen from the description above, in order to reduce the radon concentration in all homes and multi-use facilities, schools, offices, etc. where people live and work, there is an urgent need to find a method of continuously monitoring radon concentrations that are harmful to humans in real time and to reduce radon concentrations in the monitored room.

In accordance with this situation, Korean Patent Publication No. 1912680 (Oct. 23, 2018, hereinafter noted "related art") discloses a radon monitoring service system utilizing an APP and a WEB, the system being installed at each specific location in a multi-use facility where radon measurements are required, to detect the alpha particle ions produced by alpha decay from the radon gas contained in the air entering the ionization chamber, and having a communication type radon sensor including a radon measurement module that measures radon concentration for the detected alpha particle ions by noise reduction, amplification and preprocessing of pulse readings for external signals and a communication module connected to the radon measuring module and transmitting radon concentration measured by the radon measuring module, and a radon service management server that receives and monitors radon concentrations transmitted from the communication radon sensors in real time through wired or wireless communication and stores and manages the received radon concentrations in a corresponding database area.

Since the radon monitoring service system in the related art is configured so that the radon communication type radon sensor measures the radon concentration for a specific location, the radon concentration measured is stored and managed by the radon service management server, and the collected radon concentration information is provided to the user or administrator of the installation area of the radon sensor, thus the radon monitoring service system seemingly provides a meaningful radon monitoring service to users using radon sensors by monitoring indoor radon concentrations in real time.

However, the radon monitoring service system in the related art does not describe in detail how the radon sensor measures the radon concentration in the room in real time and how the radon concentration measured by the radon sensor is delivered to the radon service management server. Accordingly, it is questionable whether the radon monitoring service system in the related art can actually provide indoor radon concentration in real time to provide a reliable radon monitoring service to the user.

In addition, since the radon monitoring service system in the related art presents proposes only an information providing aspect in that radon statistics and graphs are provided using a radon service measurement value of a specific location of radon service received from radon service communication server radon sensors, it is not possible to provide a constant motivation for the user to ventilate the indoor space to reduce the radon concentration.

In addition, the radon sensor of an ionization chamber method in the related art is formed with a cylindrical structure in which the cylinder of a conductive material having a plurality of air holes is coupled to a straight probe located on the inner central axis line. Accordingly, the radon sensor is vulnerable to electromagnetic noise caused by distribution of multiple air holes, and the air inflow is too smooth due to the large number of air holes, whereby there is a problem that Thoron (Rn-220), which has a short half-life of 55.6 seconds, is also introduced into the cylindrical ionization chamber so that radon (Rn-222) and Thoron (Rn-220) may be simultaneously measured.

Therefore, the inventors have developed a radon detection device using a polyhedral ionization chamber, which has higher mountability and mass-productivity, strong resistance to electromagnetic noise, and higher measurement efficiency without the risk of electric shock or short circuit, and eliminates Thoron (Rn-220) interference, in order to solve the above problems.

In addition, the inventor has come to invent a technology for charging the user for the radon monitoring service through the pattern analysis for the radon concentration monitored in real time using a radon detection device using a polyhedral ionization chamber.

Documents of Related Art (Patent Document 0001) Korean Patent Registration No. 1912680 (published on Oct. 23, 2018)

SUMMARY OF THE INVENTION

The present invention has been made keeping in mind the above problems occurring in the related art, and an objective of the present invention is to provide a billing system and method based on concentration pattern that not only causes radon monitoring service fees to be charged to each user who uses radon monitoring services, but also provides the user with constant motivation to frequently perform ventilation actions that reduce radon concentrations in the indoor space where the user resides.

In order to achieve the above objective, according to an embodiment of the present invention, there is provided a billing system based on a radon concentration pattern analysis, the system including: a radon detection device absorbing ionic charges generated when alpha ($\alpha$) decay occurs in radon gas present in an indoor space to output alpha particle detection signals, and counting the output alpha particle detection signals for a predetermined measurement time to calculate a radon concentration value and transmit the same in real time through a communication network; and a cloud server storing information of a user using the radon detection device, generating a radon concentration pattern corresponding to the radon detection device by using a radon concentration value received from the radon detection device, analyzing the generated radon concentration pattern to determine a periodic behavior pattern of the user, and calculating a cost for radon monitoring service provided to a terminal of the user on the basis of the determined periodic behavior pattern of the user and the user information and then charging the user for the radon monitoring service, the periodic behavior pattern of the user meaning a pattern for user's ventilation actions to reduce the radon concentration value of the radon gas present in the indoor space, wherein the cloud server analyzes the generated radon concentration pattern and detects a time point when the radon concentration value decreases rapidly to determine the periodic behavior pattern of the user for a predetermined period of time.

Herein, the radon detection device may include an alpha particle detection module absorbing ion charges generated when alpha ($\alpha$) decay occurs in the radon gas contained in the air introduced into an ionization chamber of a predetermined size, to output the alpha particle detection signals through signal processing; and a control module counting the alpha particle detection signals output by the alpha particle detection module every 10 minutes for one hour to calculate an average value of remaining radon concentration values except maximum and minimum values among the measured radon concentration values and determine the same as a final radon concentration value, and performing control so that the determined final radon concentration value is transmitted in real time to the cloud server using wired or wireless communication.

Preferably, the radon detection device may include a polyhedral ionization chamber having one side opened and an inner side surrounded by a first conductor and forming an electric field therein by applying a bias power to the first conductor; a lid having one side covered with a second conductor and closing the opened one side of the ionization chamber so that the first conductor provided on an inner side of the ionization chamber and the second conductor are electrically connected to each other; a probe disposed in the ionization chamber to absorb ion charges generated when alpha ($\alpha$) decay occurs in the ionization chamber; and a measurement circuit unit outputting the alpha particle detection signals by amplifying and processing an electric micro signal input from the probe to a predetermined size.

Preferably, the system may further include a time measurement module generating detection time information at a time point when the alpha particle detection signals output by the alpha particle detection module is counted; a GPS module collecting location information of the radon detection device; and a storage module storing the detection time information generated by the time measurement module and the location information of the radon detection device collected by the GPS module by matching the same to the final radon concentration value calculated by the control module, wherein the control module performs control so that the detection time information generated from the time measurement module and the location information of the radon detection device collected from the GPS module are transmitted to the cloud server in real time.

Preferably, the radon detection device may transmit the determined final radon concentration value and identification information of the radon detection device to the cloud server in real time through the communication network.

Preferably, the cloud server may include a data collection unit collecting identification information of the radon detection device, location information of the radon detection device, detection time information at a time point when the alpha particle detection signals are counted, and the radon concentration value from the radon detection device; a memory unit storing the identification information of the radon detection device collected by the radon detection device, the location information of the radon detection device, the detection time information, and the radon concentration value by matching the same with the information of the user using the radon detection device unit; a pattern generation unit generating a radon concentration pattern corresponding to the radon detection device for each user, by using the radon concentration value collected from the radon detection device through the data collection unit, the identification information of the radon detection device, the location information of the radon detection device, the detection time information, and the user information; a pattern determination unit analyzing the radon concentration pattern generated by the pattern generation unit and determining that a user's ventilation action has occurred at a time point when the radon concentration value drastically decreases, to calculate the number of occurrences of the user's ventilation action for a predetermined period of time; and a billing unit calculating a cost for the radon monitoring service provided to the user terminal on the basis of the information of the user using the radon detection device and the number of occurrences of the user's ventilation action determined by the pattern determination unit for a predetermined period of time and then charging the user for the radon monitoring service.

Herein, the billing unit may include a billing information database storing the information of the user using the radon detection device and the billing information according to the number of occurrences of the user's ventilation action determined by the pattern determination unit; and a billing calculation module calculating the cost for the radon monitoring service provided to the user on the basis of the information of the user using the radon detection device and the number of occurrences of the user's ventilation action calculated by the pattern determination unit for the predetermined period of time by using the billing information confirmed through the billing information database and then charging the user for the radon monitoring service provided to the user terminal.

Preferably, the billing unit may calculate the cost for the radon monitoring service according to a rental period for which the radon detection device is rented to charge the user for the radon monitoring service, when the information of the user using the radon detection device identified through the memory unit is found to be a user who rents the radon detection device.

Preferably, the billing unit may calculate the cost for the radon monitoring service provided to the terminal of the user on the basis of the number of occurrences of the user's ventilation action calculated by the pattern determination unit for the predetermined period of time to charge the user for the radon monitoring service, when the information of the user using the radon detection device identified through the memory unit is found to be a user who purchases the radon detection device.

Preferably, the greater the number of occurrences of the user's ventilation action determined by the pattern determination unit for the predetermined period of time, the less the billing unit sets the cost for the radon monitoring service provided to the user.

In order to achieve the above objective, according to an embodiment of the present invention, there is provided a billing method based on radon concentration pattern analysis of a cloud server providing radon monitoring service to a user terminal, the method including: by the cloud server, storing identification information of a radon detection device corresponding to each of multiple radon detection devices and information of a user who uses the radon detection device, in a memory unit; by the cloud server, receiving a radon concentration value from the radon detection device; by the cloud server, generating a radon concentration pattern corresponding to the identification information of the radon detection device using the radon concentration value received from the radon detection device; by the cloud server, determining a user's periodic behavior pattern by analyzing the generated radon concentration pattern, the user's periodic behavior pattern meaning a pattern for a user's ventilation action that reduces a radon concentration value of radon gas present in an indoor space in which the radon detection device is disposed; and by the cloud server, calculating a cost for the radon monitoring service provided to the user terminal on the basis of the user's periodic behavior pattern determined and the information of the user, and then charging the user for the radon monitoring service, wherein the determining of the user's periodic behavior pattern user includes analyzing the generated radon concentration pattern and detecting a time point when the radon concentration value is drastically reduced to calculate the number of occurrences of the user's ventilation action for a predetermined period of time.

Herein, the method may further include, before receiving the radon concentration value from the radon detection device, by the radon detection device, absorbing ion charges generated when alpha (α) decay occurs in the radon gas present in the indoor space in which the radon detection device is disposed to output alpha particle detection signals; and by the radon detection device, counting the output alpha particle detection signals every 10 minutes for one hour to calculate an average value of remaining radon concentration values except maximum and minimum values among the measured radon concentration values and determine the same as a final radon concentration value, and transmitting the determined final radon concentration value to the cloud server in real time through a communication network.

Preferably, the transmitting of the determined final radon concentration value to the cloud server time through the communication network may include transmitting the determined final radon concentration value and the identification information of the radon detection device to the cloud server in real time through the communication network.

Preferably, the determining of the user's periodic behavior pattern may include analyzing the generated radon concentration pattern to determine that the user's ventilation action is generated at a time point when the radon concentration value drastically decreases, and detecting the time point when the radon concentration value rapidly decreases to calculate the number of occurrences of the user's ventilation action user for the predetermined period of time.

Preferably, the charging of the user for the radon monitoring service may include checking whether the information of the user using the radon detection device identified through the memory unit is a user who rents the radon detection device or a user who purchases the radon detection device; and calculating the cost for the radon monitoring service provided to the user terminal on the basis of the number of occurrences of the user's ventilation action for the predetermined period of time and charging the radon monitoring service to the user, when the information of the user using the radon detection device identified through the memory unit indicates a user who purchases the radon detection device.

Preferably, in the charging of the user for the radon monitoring service, the greater the number of occurrences of the user's ventilation action for the predetermined period of time, the less the user is charged the cost for the radon monitoring service.

Preferably, the charging of the user for the radon monitoring service may include checking whether the information of the user using the radon detection device identified through the memory unit is a user who rents the radon detection device or a user who purchases the radon detection device; and as a result of the checking, calculating the cost for the radon monitoring service according to a rental period for which the radon detection device is rented to charge the user for the radon monitoring service, when the information of the user using the radon detection device identified through the memory unit is found to be a user who rents the radon detection device.

According to an embodiment of the present invention, a radon concentration pattern is generated by using the radon concentration value detected from the radon detection device, and the generated radon concentration patterns are analyzed to determine periodic behavior patterns of users who are living in the place where the radon detection device is placed. Accordingly, since the users are variably charged for the radon monitoring service according to the determined the user's periodic behavior pattern and the user information, there is an advantage that allows the cost for the radon monitoring service to be charged to each user using the radon monitoring service.

In addition, according to an embodiment of the present invention, it is determined that the user's ventilation action has occurred at a time point when the radon concentration sharply decreases for a predetermined period of time on the basis of the radon concentration pattern analysis, and then the number of occurrences of a user's ventilation action is calculated. Accordingly, there is an advantage that the user may be motivated to frequently perform the ventilation action that reduces the radon concentration, by charging the user for the radon monitoring service on the basis of the calculated number of occurrences of a user's ventilation action.

In addition, according to an embodiment of the present invention, the cost for the radon monitoring service is charged less to users who frequently perform ventilation actions than users who do not perform ventilation actions, among users using the radon monitoring service. As a result, the user can benefit from the reduced cost of using the radon monitoring service according to the number of the occurrences of ventilation action of the user.

In addition, according to an embodiment of the present invention, the radon monitoring service is provided in real time by using the radon detection device using a polyhedral ionization chamber, which has higher mountability and mass productivity, strong resistance to electromagnetic noise, and higher measurement efficiency without the risk of electric shock or short circuit, and eliminates Thoron (Rn-220) interference, instead of the radon detection device using a cylindrical ionization chamber. Accordingly, there is an effect that the user can determine the value of the radon concentration present in the indoor air in real time.

In addition, according to an embodiment of the present invention, a company providing a radon monitoring service allows reduction of the user's burden of using a radon monitoring service according to the ventilation action of the user. Accordingly, since it is easy for the company to secure users using the radon monitoring service, there is an effect that it is possible to maintain sustainable revenue generation.

Furthermore, according to an embodiment of the present invention, there are effects that it is possible to improve the response level to the customer and a variety of marketing information may be utilized due to the new billing method.

BRIEF DESCRIPTION OF THE DRAWINGS

The above and other objects, features, and other advantages of the present invention will be more clearly understood from the following detailed description when taken in conjunction with the accompanying drawings, in which:

FIG. 2 is a block diagram illustrating a cloud server according to an embodiment of the present invention.

FIG. 4 is a block diagram illustrating a radon detection device according to an embodiment of the present invention.

FIG. 8 is a flowchart illustrating a billing method using a billing system based on radon concentration pattern analysis according to an embodiment of the present invention.

FIG. 9 is a flowchart illustrating step S190 in which the cloud server of FIG. 8 performs a charging function.

DETAILED DESCRIPTION OF THE INVENTION

Figure 1:
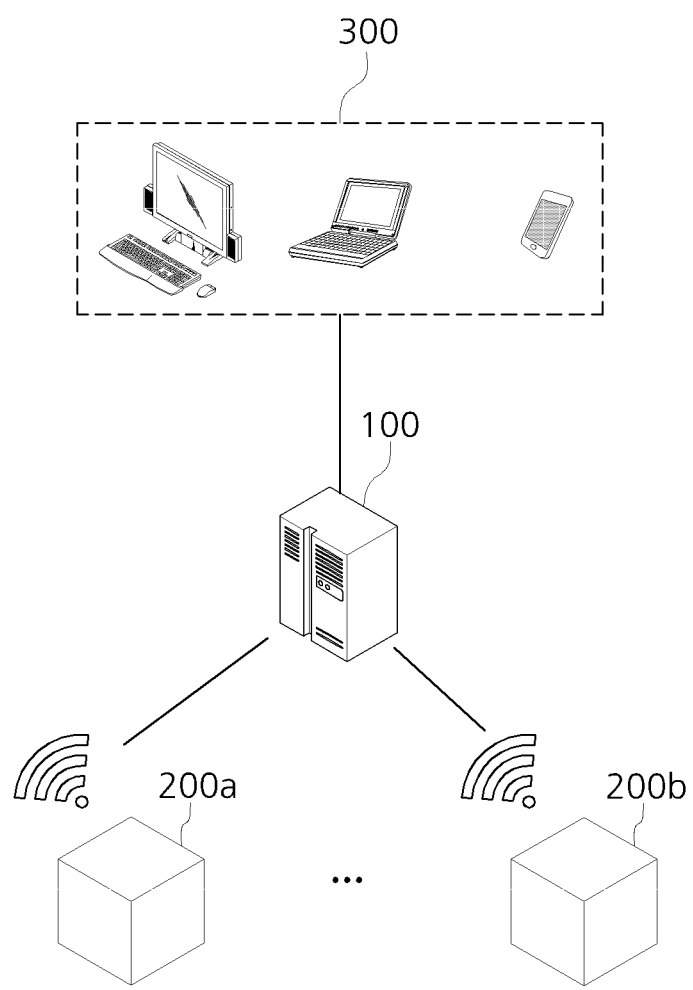
FIG. 1 is a schematic configuration diagram of a billing system based on radon concentration pattern analysis according to an embodiment of the present invention.

Hereinafter, embodiments of the present invention will be described in detail with reference to the accompanying drawings.

The above objects, features, and advantages will be described in detail with reference to the accompanying drawings, whereby those skilled in the art to which the present invention pertains may easily implement the technical idea of the present invention. In describing the present invention, when it is determined that the detailed description of the known technology related to the present invention may unnecessarily obscure the gist of the present invention, the detailed description will be omitted.

Terms including ordinal numbers such as first and second may be used to describe various components, but the components are not limited by the terms. The terms are used only for the purpose of distinguishing one component from another. For example, without departing from the scope of the present invention, the first component may be referred to as the second component, and similarly, the second component may also be referred to as the first component. The terminology used herein is for the purpose of describing particular example embodiments only and is not intended to be limiting of the present invention. Singular expressions include plural expressions unless the context clearly indicates otherwise.

The terms used in the present invention have been selected as widely used general terms as possible in consideration of the functions in the present invention, which may vary according to the intention or precedent of the person skilled in the art, the emergence of new technologies, etc. In addition, in certain cases, there may be terms arbitrarily selected by the applicant, in which case the meaning will be described in detail in the description of the invention. Therefore, the terms used in the present invention should be defined based on the meanings of the terms and the contents throughout the present invention, rather than the names of the simple terms.

When it is said that a part in the specification "comprises" any component, this means that it may further include other components, rather than excluding other components unless specifically stated otherwise. In addition, the terms "unit", "module", and the like described in the specification mean a unit for processing at least one function or operation, which may be implemented in hardware or software or a combination of hardware and software.

Hereinafter, embodiments of the present invention will be described with reference to the accompanying drawings. However, embodiments of the present invention illustrated below may be modified in various other forms, and the scope of the present invention is not limited to the embodiments described below. The embodiments of the present invention are provided to more completely explain the present invention to those skilled in the art.

Hereinafter, preferred embodiments of the present invention will be described in detail with reference to the accompanying drawings.

First, the billing system based on concentration pattern analysis according to the present invention has a function of providing a radon monitoring service for notifying a user who purchases or rents a radon detection device of the radon concentration value detected by the radon detection device disposed in an indoor space, and accumulating and recording the radon concentration values to generate the radon concentration pattern and analyzing the generated radon concentration pattern to determine a periodic behavior pattern of the user.

Meanwhile, the radon detection device according to the present invention can detect the radon concentration value of the radon gas present in the indoor space and thus provide a user with a reliable radon concentration value in real time, by using the radon detection device using a polyhedral ionization chamber, which has higher mountability and mass-productivity, strong resistance to electromagnetic noise, and higher measurement efficiency without the risk of electric shock or short circuit, and eliminates Thoron (Rn-220) interference, instead of the radon detection device using a cylindrical ionization chamber in the related art. Of course, although radon concentration patterns are analyzed by simultaneously using the radon detection device using a polyhedral ionization chamber and the radon detection device using a cylindrical ionization chamber in the related art, or by using the radon detection device using multiple polyhedral ionization chambers, they will not depart from the gist of the invention.

The user's periodic pattern described above represents a pattern of ventilation actions performed for each time zone in order to reduce the radon concentration value of the radon gas present in the indoor space. Therefore, according to the present invention, the radon detection device is preferably disposed in a location where the user's ventilation action is required, because the value of radon concentration may be probably detected high.

Figure 3A:
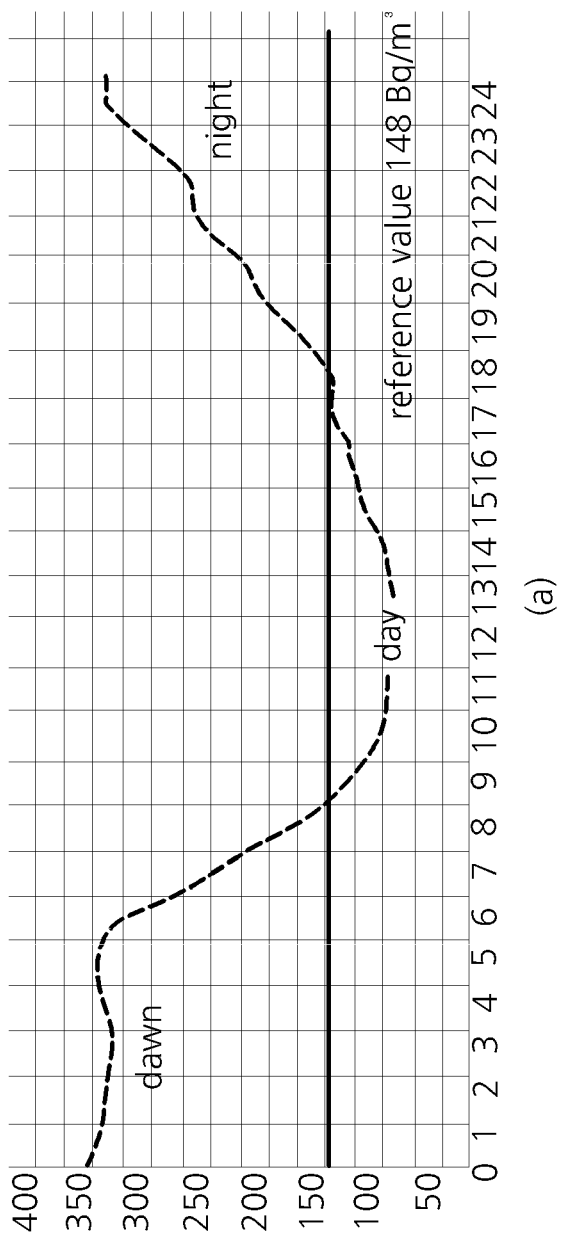
FIGS. 3A and 3B are graphs illustrating a method of analyzing a radon concentration pattern generated by the alpha particle detection signal output from the radon detection device according to an embodiment of the present invention.
Figure 3B:
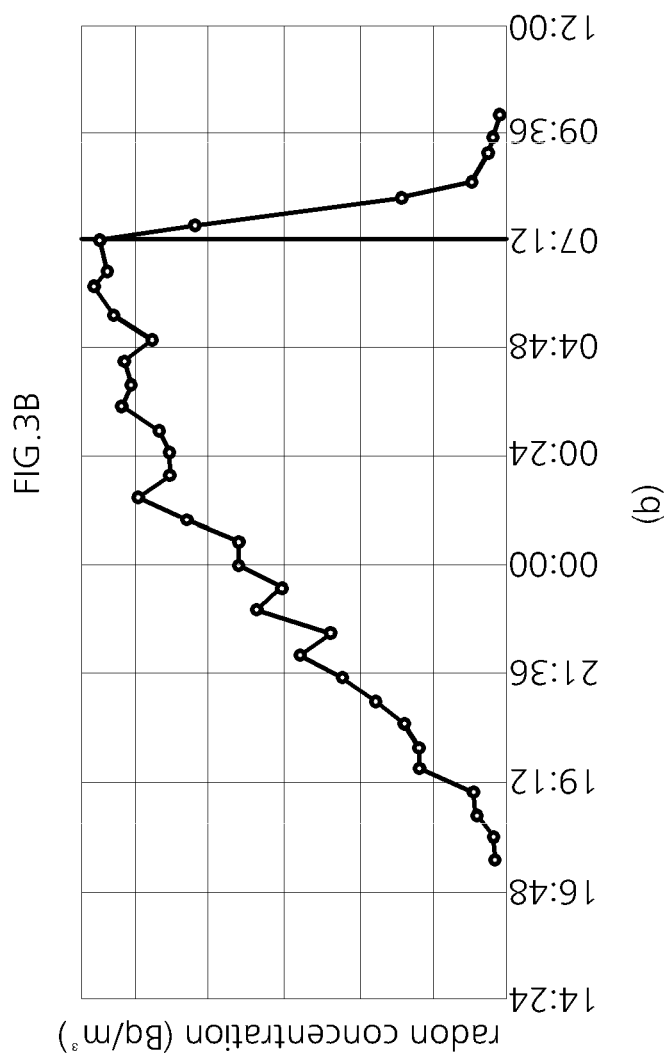

FIG. 1 is a schematic configuration diagram illustrating a billing system based on radon concentration pattern analysis according to an embodiment of the present invention; FIG. 2 is a block diagram illustrating a cloud server based on radon concentration pattern analysis according to an embodiment of the present invention; FIGS. 3A and 3B are graphs illustrating a method of analyzing a radon concentration pattern generated according to the alpha particle detection signal output by the radon detection device applied to the embodiments of the present invention; and FIG. 4 is a block diagram illustrating a radon detection device according to an embodiment of the present invention.

Referring to FIGS. 1 and 2, the billing system based on radon concentration pattern analysis according to an embodiment of the present invention includes a cloud server 100, radon detection devices 200a and 200b, and a user terminal 300.

The billing system based on concentration pattern analysis is provided so that the radon detection device 200a or 200b and the user terminal 300 are connected to the cloud server 100 through a communication network.

The communication network is an interconnection network that allows the cloud server 100 to communicate with each of the radon detection devices 200a and 200b and the user terminal 300, and includes various communication networks such as a wireless LAN network, a mobile communication network, an Internet network, a portable Internet, and the like.

The cloud server 100 may provide a radon monitoring service application so as to provide radon monitoring service to a user registered as a member in the user information, thereby providing the radon monitoring service to the user who purchases or rents the radon detection device 200a or 200b.

This cloud server 100 includes a data collection unit 110, a memory unit 120, a pattern generation unit 130, a pattern determination unit 140, a billing unit 150, and further includes a controller (not shown) for controlling and managing each of the components.

A controller (not shown) of the cloud server 100 may control and manage each component constituting the cloud server and the radon detection devices 200a and 200b.

The controller of the cloud server 100 receives information on a payment means for the user to pay for the radon monitoring service costs and payment information including some or all of payment methods from the user terminal 300 through the data collection unit 110, and then stores and manages the same in the memory unit 120.

In addition, the controller of the cloud server 100 receives and manages the user information about a type of a user (for example, purchase customer, rental customer), purchase date, rental date, rental period, etc. from the user terminal 300 through data collection unit 110. Here, the controller of the cloud server 100 may store the user information in the memory unit 120, and classify the billing information for each user to store and manage the same.

The controller of the cloud server 100 collects radon concentration values detected from the multiple radon detection devices 200a and 200b in conjunction with the radon detection devices 200a and 200b through the data collection unit 110, and transmits the collected radon concentration values to the terminal 300 of the user who purchases or rents the radon detection device, in real time.

The controller of the cloud server 100 may store and manage the database based on the radon concentration values collected from the radon detection devices 200a and 200b through the data collection unit 110 in the memory unit 120, according to at least one of on a per region basis, on a per location basis, on a per season basis, on a per time basis, on a per building basis, and on a per floor basis.

In addition, the controller of the cloud server 100 may evaluate the risk on the basis of the radon concentration values collected from the radon detection devices 200a and 200b according to at least one of on a per region basis, on a per location basis, on a per season basis, on a per time basis, on a per building basis, and on a per floor basis, and perform control so that the risk is displayed on a display screen of the user terminal 300 accessing the cloud server 100 by mapping the risk according to the evaluated criteria to pre-stored environment map information data.

The data collection unit 110 of the cloud server 100 may receive information about a user who purchases or rents a radon detection device among the multiple radon detection devices 200a and 200b, from a user terminal 300. For example, the user may include a type of a user (for example, purchaser, rental customer), purchase date, rental date, rental period, and the like. In addition, the user information may be stored in the memory unit 120 by matching the same with identification information of the radon detection device purchased or rented by the user and radon concentration values received from each radon detection device.

In addition, the data collection unit 110 of the cloud server 100 collects the radon concentration values collected from the multiple radon detection devices 200a and 200b, as well as collects detection time information at a time point when alpha particle detection signals (e.g., pulse signals) output by the radon detection devices 200a and 200b are counted for a predetermined measurement time (e.g., 10 minutes, 1 hour, etc.), identification information of the radon detection device, location information of the radon detection device, from radon detection devices 200a and 200b.

The memory unit 120 of the cloud server 100 may store detection the time information at a time point when counting the alpha particle detection signals collected by the radon detection devices (200a, 200b) through a data collection unit 110, the identification information of the radon detection device, the location information of the radon detection device, and the radon concentration value.

Here, the memory unit 100 stores the information of the user who uses the radon detection devices 200a and 200b as member information using a radon monitoring service, by matching the information collected from the radon detection device with the information of the user who uses the radon detection devices 200a and 200b. Here, the user information includes information about a type of the user (e. g. purchaser, rental customer), purchase date, rental date, rental period, and the like.

In addition, the memory unit 120 receives and stores information on a payment means for the user to pay for the radon monitoring service costs and user payment information including some or all of payment method from the user terminal 300 through the data collection unit 110.

The pattern generation unit 130 of the cloud server 100 may generate a radon concentration pattern corresponding to each of the radon detection devices 200a and 200b through the data collection unit 110, by using radon concentration values collected by radon detection devices 200a and 200b, detection time information at a time point when the radon detection devices 200a and 200b counts alpha particle detection signals, identification information of the radon detection device, location information of the detection device, and information of the user.

The pattern generation unit 130 of the cloud server 100 generates a radon concentration pattern using the information collected by the radon detection devices 200a and 200b as described above, and provides the user with radon monitoring service in real time, by providing the generated radon concentration pattern to the user terminal 300 upon user request.

The pattern determination unit 140 of the cloud server 100 may determine a periodic behavior pattern of each user who uses the radon detection device, by generating and analyzing the radon concentration pattern corresponding to the radon detection device that each user purchases or rents by using radon concentration values collected in conjunction with the multiple radon detection devices 200a and 200b.

Specifically, the cloud server 100 may analyze the generated radon concentration pattern and detect a time point when the radon concentration value is sharply reduced, thereby determining the user's periodic behavior pattern for a predetermined period of time. Here, the user's periodic behavior pattern refers to a pattern of ventilation actions that the user periodically performs so as to reduce the concentration value of the radon present in the indoor space where the radon detection device is disposed.

FIG. 3A is a graph showing a radon concentration pattern generated using the radon concentration value collected from the radon detection device applied to the present invention. As shown, FIG. 3A has an axis of time (horizontal axis) and an axis of radon concentration (vertical axis), in which the time axis is applied in any one of a minute unit and an hour unit.

According to the radon concentration pattern shown in FIG. 3A, it shows a type of the radon concentration in indoor space being generally highest in the evenings and dawn and lower during the day. In order to minimize the damage due to such type of radon concentration, it is important to perform a ventilation action, which is an easy way to effectively reduce a radon concentration in the room before going to bed.

In addition, there is a time point when the radon concentration value sharply decreases in a curve of radon concentration changes with time shown in FIG. 3B. Here, the time point when the radon concentration value is sharply reduced indicates a time point when ventilation actions occur, the ventilation actions including an user's behavior of opening a window or an user's behavior of operating a radon reduction equipment disposed in the indoor space. Here, the radon reduction equipment is essentially provided with a radon fan for discharging the air to the outside.

Based on the above, the pattern determination unit 140 of the cloud server 100 analyzes the radon concentration pattern generated by the pattern generation unit 130 and determines that the user's ventilation action has occurred at a time point when the radon concentration value is sharply reduced, thereby calculating the number of occurrences of the user's ventilation action for a predetermined period of time (e.g., monthly). Here, the predetermined period means a periodic period from a time point when the user is registered as a member of the company providing the radon monitoring service to a time point when the user is charged the cost for the radon monitoring service. In addition, the predetermined period may mean a period until the user is charged differential fee according to the user's membership level.

The charging unit 150 of the cloud server 100 calculates the cost for the radon monitoring service provided to the user terminal 300, on the basis of the information of the user using the radon detection devices 200a and 200b and the number of occurrences of the user's ventilation action user calculated by the pattern determination unit 140 for a predetermined period of time, and charges a user having a user terminal 300 for the radon monitoring service.

Specifically, the billing unit 150 may include a billing information database that stores billing information according to the number of occurrences of the user's ventilation action calculated by the pattern determination unit 140 and the information of the user using the radon detection devices 200a and 200b. In addition, the billing information database may further include billing information according to the rental period for which the radon detection device is rented, in order to cause the radon monitoring service fee to be charged to the user who rents the radon detection device.

The billing unit 150 of the cloud server 100 further includes a billing calculation module calculating the cost for the radon monitoring service provided to the user and then performing billing for the radon monitoring service provided to the user terminal 300, on the basis of the information of the user using radon detection devices 200a and 200b and the number of occurrences of the user's ventilation action calculated by the pattern determination unit 140 for a predetermined period of time, by using the billing information confirmed through the billing information database.

In addition, the billing unit 150 of the cloud server 100 may calculate the cost for the radon monitoring service provided to the user terminal of the user and charge the user for the radon monitoring service, on the basis of the number of occurrences of the user's ventilation action calculated by the pattern determination unit 140 for a predetermined period of time, when the information of the user using the radon detection device 200a or 200b identified through the memory unit 120 is determined to be the user who purchases the radon detection device 200a or 200b. Here, the larger number of occurrences of a user's ventilation action determined by the pattern determination unit 140 for the predetermined period of time, the smaller amount the billing unit 150 may set for the radon monitoring service provided to the user.

Accordingly, the more frequently the ventilation action is performed to reduce a radon concentration in an indoor space during the use of the radon monitoring service, the less the user who purchases the radon detection device may pay for the radon monitoring service. This has an advantage that the user who purchases the radon detection device 200a or 200b may continuously be motivated to frequently perform ventilation actions that reduce radon concentrations in the indoor space where the user resides during the use of the radon monitoring service provided to the user terminal 300.

In addition, the billing unit 150 of the cloud server 100 calculates the cost for the radon monitoring service according to the rental period of the radon detection device 200a or 200b and charges the user for the radon monitoring service, by using the billing information according to the rental period of the rental radon detection devices 200a and 200b stored in the billing information database, when the information of the user using the radon detection device 200a or 200b identified through the memory unit 120 make certain that the user rents the radon detection device. Herein, the billing information according to the rental period of the radon detection devices 200a and 200b is applied on a daily basis. The longer the rental period of the radon detection device 200a or 200b, the less the user may be charged.

Meanwhile, referring to FIG. 4, the radon detection device 200a or 200b according to an embodiment of the present invention is disposed in an indoor space where the user resides after the user purchases or rends the same. The radon detection devices 200a or 200b is configured to include an alpha particle detection module 210, a control module 400, a time measurement module 500, a GPS module 600, a display module 700, a storage module 800, a communication module 900, a power supply module 1000, and the like.

Here, the alpha particle detection module 210 serves to absorb ion charges generated when the alpha (a) decay occurs in the radon gas contained in the air introduced into the ionization chamber of a predetermined size and output an alpha particle detection signal through signal processing.

The control module 400 of FIG. 4 controls the overall operation of the radon detection device 200a or 200b (FIG. 1) and a signal flow between components in the radon detection device 200a or 200b (FIG. 1) and performs a data processing function that processes the data.

The control module 400 is preferably a micro controller (MCU), and performs a function of receiving an alpha particle detection signal which is an electrical signal output from the alpha particle detection module 210 in real time to compare the same with a waveform of signal pattern information data according to types of noise signals that are pre-stored, and determining whether the same is the normal signal or abnormal signal.

The control module 400 performs control in such a manner as to count the alpha particle detection signals output by the alpha particle detection module 210 every 10 minutes for one hour, calculate an average value of the remaining radon concentration values except maximum and minimum values among the measured radon concentration values and then determine the same as a final radon concentration value, and transmit the determined final radon concentration value using the communication module 900 in real time to the cloud server (100 in FIG. 1) through wired or wireless communication.

In addition, the control module 400 may perform a function of controlling the determined final radon concentration value in such a manner to be displayed on a display screen, that is, the display module 700.

The time measurement module 500 generates the detection time information of a time point when the alpha particle detection signals output by the alpha particle detection module 210 are counted, and the GPS module 600 collects the location information of the radon detection device 200a or 200b (FIG. 1) at predetermined time intervals.

The display module 700 may be configured in such a manner as to display various states (for example, failure, alarms, etc. of components including various modules) of the device, including the final radon concentration value determined under the control of the control module 400.

The display module 700 may be configured with a video display module, such as, for example, a liquid crystal display (LCD), a light emitting diode (LED), a plasma display panel (PDP), a touch screen, a head up display (HUD), a PMP, navigation, and the like.

The storage module 800 stores program and data required for the operation of the radon detection device 200a or 200b (FIG. 1). In particular, the storage module 800 stores the detection time information generated by the time measurement module 500 and the location information of the radon detection devices 200a and 200b collected by the GPS module 600, by matching the same with the final radon concentration value calculated by the control module 400. In addition, the storage module 800 may store identification information of the radon detection device corresponding to each of the radon detection devices 200a and 200b (FIG. 1).

The communication module 900 may be connected to a communication network so that the final radon concentration value calculated through the control module 400 may be transmitted in real time to a predetermined cloud server 100 or a user terminal 300. In addition, the communication module 900 transmits a transmission signal according to operations of at least one of an alpha particle detection module 210, a control module 400, a time measurement module 500, and a GPS module 600 to the cloud server 100. In particular, the communication module 900 may transmit the detection time information generated by the time measurement module 500, the location information of the radon detection device (200a or 200b of FIG. 1) collected by the GPS module 600, and the identification information of the radon detection device stored in the storage module 800, when transmitting the final radon concentration value calculated by the control module 400 to the cloud server (100 in FIG. 1).

When performing the data communication wirelessly, the communication module 900 may perform wireless communication with the cloud server 100 or the user terminal 300 under the control of the control module 400, by using various types of wireless communications, such as, for example, Wi-Fi communication, WiGig communication, wireless broadband internet (WiBro) communication, world interoperability for microwave access (WiMAX) communication, high speed packet access (HSPA) communication, radio frequency identification (RFID) communication, infrared data association (IrDA) communication, Bluetooth communication, ZigBee communication, ultra-wideband (UWB) communication, code division multiple access (CDMA) communication, 3G LTE network, 4G or 5G communication.

Meanwhile, the communication network is a high-speed network of a large communication network over which large-capacity, long-distance voice, and data services are possible, and may be the next generation wireless network including the Internet or WiFi, Wibro, Wimax, etc. for providing high-speed multimedia services.

The Internet refers to the global open computer network structure that provides several services that exist in the TCP/IP protocol and its upper layers, that is, HTTP (Hyper Text Transfer Protocol), Telnet, File Transfer Protocol (FTP), Domain Name System (DNS), Simple Mail Transfer Protocol (SMTP), and Simple Network Management Protocol (SNMP), Network File Service (NFS), Network Information Service (NIS), and the like. The Internet provides an environment in which the communication module 900 connected to the control module 400 may be connected to the cloud server 100 or the user terminal 300. Meanwhile, the Internet may be a wired or wireless Internet, or may be a core network integrated with a wired public network, a wireless mobile communication network, a portable Internet, or the like.

When the communication network is a mobile communication network, the communication network may be a synchronous mobile communication network or an asynchronous mobile communication network. As an example of the asynchronous mobile communication network, a communication network of a wideband code division multiple access (WCDMA) is cited. Herein, although not shown in the drawings, the mobile communication network may include, for example, a Radio Network Controller (RNC). Meanwhile, although the WCDMA network is cited as an example, the communication network may be the next generation communication network such as 3G LTE network, 4G network, 5G network, as well as an IP network based on IP. The communication network serves to transfer signals and data between the communication module 900 connected to the control module 400 and the cloud server 100 or the user terminal 300.

Since the power supply module 1000 is to perform a function of supplying the power required for each module, the power supply module 1000 is preferably implemented as a typical portable battery, but the present invention is not limited thereto. The power supply module 1000 may be implemented to convert a commercial alternating current (AC) power source (e.g., AC 220V) into a direct current (DC) power source for the purpose of continuous power supply.

In addition, the power supply module 1000 may supply power required for the bias power (10 in FIG. 6) provided in the alpha particle detection module 210 under the control of the control module 400.

Meanwhile, the user terminal (300 of FIG. 1) is, generally a computer, such as a desktop PC (Personal Computer), notebook PC, and the like, but the present invention is not limited thereto and may be any type of wired or wireless communication device. For example, the user terminal 300 (FIG. 1) includes various mobile terminals that performs communication via wireless or portable Internet, and may mean all wired/wireless home appliances/communication devices having a user interface for accessing the control module 200, such as a palm PC, a smart phone, a mobile play-station, digital multimedia broadcasting (DMB) phone having a communication function, a tablet PC, an iPad, and the like.

In particular, when the user terminal (300 of FIG. 1) is implemented as a typical smart phone, the smart phone is based on an open operating system that may freely download, use, and delete a variety of applications that the user wants, unlike a typical mobile phone (named feature phone). It is appreciated that the smart phone may be understood as any mobile phone having a mobile office function, in addition to voice/video call and Internet data communication functions, or any communication device including any Internet phone or tablet PC capable of being connected via an Internet without voice call function.

The smart phone may be equipped with a variety of open operating system, in which the open operating system may be configured with, for example, Symbian made by Nokia, BlackBerry made by RIMS, iPhone made by Apple, Windows Mobile made by Microsoft, Android made by Google, and Bada made by Samsung.

As such, the smart phone uses an open operating system, and thus a user may arbitrarily install and manage various application programs, unlike a mobile phone having a closed operating system.

In particular, when the user terminal (300 of FIG. 1) according to an embodiment of the present invention is implemented in a smart phone, the user may download and execute an application program providing a radon monitoring service through the App Store (App Store), etc. Accordingly, the user may be provided with a service for monitoring, in real time, the radon concentration value of the indoor space in which the radon detection device (200a or 200b of FIG. 1) is disposed.

As described above, in order to charge the user for the radon monitoring service provided to the user terminal (300 of FIG. 1), the user should be provided with higher reliable radon monitoring service so that the user may continuously use the radon monitoring service. In order to implement this, the radon detection device 200a or 200b of the present invention should measure the radon concentration present in the indoor air with high reliability.

In order to implement this, the inventor of the present invention has developed a radon detection device using a polyhedral ionization chamber, which has higher mountability and mass-productivity, stronger resistance to electromagnetic noise, and higher measurement efficiency without the risk of electric shock or short circuit, and eliminates Thoron (Rn-220) interference, compared to a radon detection device using a cylindrical ionization chamber in the related art. In the present invention, the inventor applies the radon detection device using a polyhedral ionization chamber developed by the inventor.

The radon detection device 200 using the polyhedral ionization chamber will be more specifically described as follows.

Figure 5:
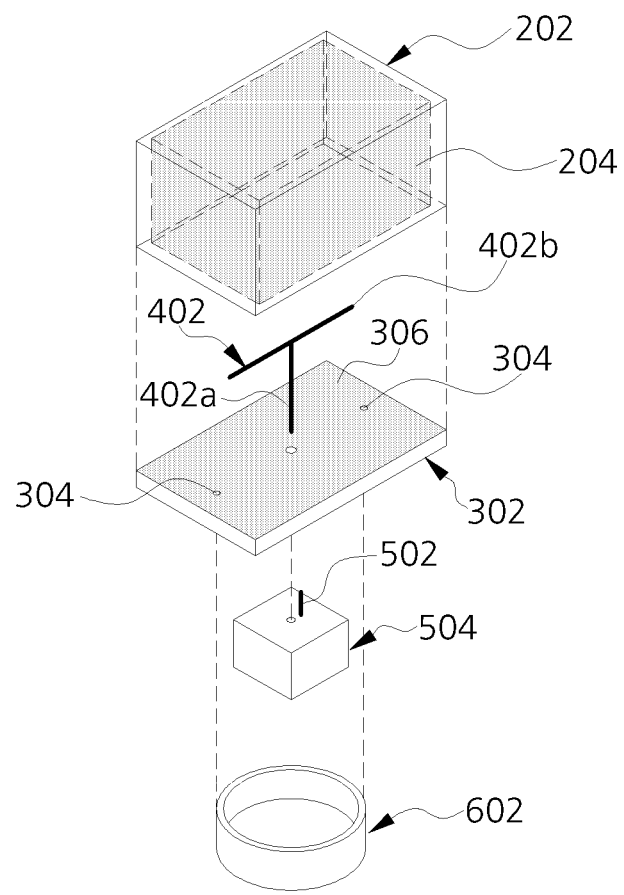
FIG. 5 is a perspective view illustrating a shape of a radon detection device using a polyhedral ionization chamber according to an embodiment of the present invention.
Figure 6:
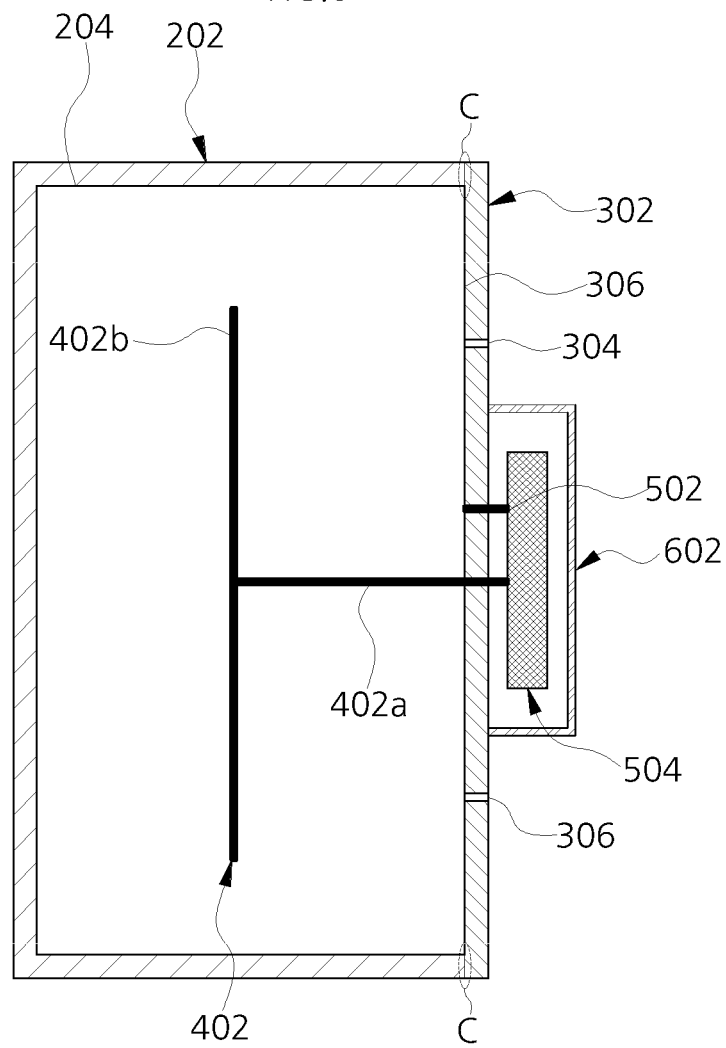
FIG. 6 is a cross-sectional view illustrating a shape of a radon detection device using a polyhedral ionization chamber according to an embodiment of the present invention.

FIG. 5 is a perspective view illustrating a shape of a radon detection device using a polyhedral ionization chamber according to an embodiment of the present invention; FIG. 6 is a cross-sectional view illustrating a shape of a radon detection device using a polyhedral ionization chamber according to an embodiment of the present invention; and FIG. 7 is a specific configuration diagram illustrating a measurement circuit unit applied to a radon detection device using a polyhedral ionization chamber according to an embodiment of the present invention.

Figure 7:
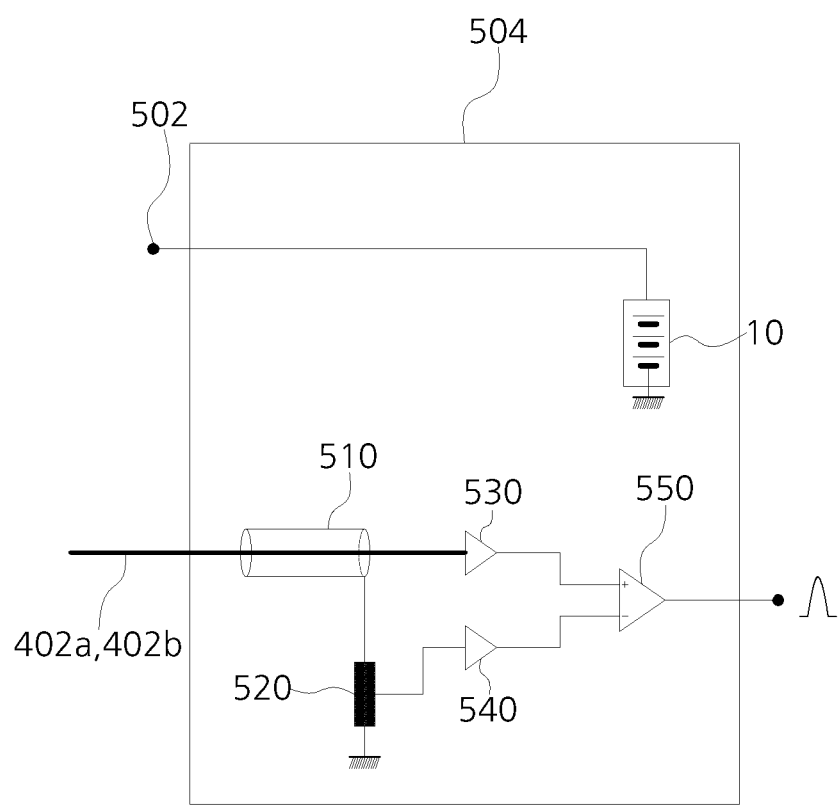
FIG. 7 is a specific configuration diagram illustrating a measurement circuit unit applied to a radon detection device using a polyhedral ionization chamber according to an embodiment of the present invention.

Referring to FIGS. 5 to 7, the radon detection device using a polyhedral ionization chamber according to an embodiment of the present invention is configured to include an ionization chamber 202, a lid 302, a probe 402, and a measurement circuit unit 504. In addition, the polyhedral ionization chamber according to an embodiment of the present invention may further include an electromagnetic wave protection cap 602. Meanwhile, since the components shown in FIGS. 5 to 7 are not essential, a radon sensor device using a polyhedral ionization chamber according to an embodiment of the present invention may have more or fewer components.

Hereinafter, the components of the radon sensor device using the polyhedral ionization chamber according to an embodiment of the present invention will be described in detail.

The ionization chamber 202 has a polyhedral shape having one side open and an inner side surrounded by a first conductor 204 of a conductive material, and performs a function of applying a bias power supply 10 to the first conductor 204 to form an electric field therein.

The ionization chamber 202 is preferably formed in a shape of a hexahedron (for example, a cube or a cuboid, etc.) using an insulating material such as plastic, but the present invention is not limited thereto and may be made of, for example, a three-dimensional polygon enclosed by four or more planes such as tetrahedron, pentagon, octahedron, octahedron.

In addition, the first conductor 204 provided on the inner surface of the ionization chamber 202 is preferably coated with a conductive paint to have a predetermined thickness on the inner surface of the ionization chamber 202.

In addition, the bias power source 10 applied to the first conductor 204 provided on the inner side of the ionization chamber 202 is preferably a DC voltage in the range of about 50V to 300V.

That is, the bias power supply 10 of the high voltage is applied to the first conductor 204 provided on the inner surface of the ionization chamber 202 and the second conductor 306 provided on one side of the lid 302 to be described later, to form an electric field between the probe 402 in the ionization chamber 202 and the first conductor 204 provided on the inner side of the ionization chamber 202 and the second conductor 306 provided on one side of the lid 302, whereby the ion current generated when the alpha (a) decay occurs is absorbed by the probe 402. The ionization chamber 202 can be implemented at a simple configuration and low cost, and has an effect of allowing three-dimensional measurement.

In addition, the bias power supply 10 of high voltage applied to the first conductor 204 provided on the inner surface of the ionization chamber 202 and the second conductor 306 provided on one side of the lid 302 uses a stable DC voltage in the range of about 50V to 300V (more preferably, about 50V to 150V), so that additional ion charges may occur effectively when alpha decay occurs in the ionization chamber 202. Meanwhile, the power supplied from the bias power supply 10 of high voltage (for example, voltage or current, etc.) may be variably applied according to the measurement range and sensitivity.

The lid 302 is to perform a function of closing the opened one side of the ionization chamber 202, the one side being covered with a second conductor 306 of a conductive material, in which the first conductor 204 provided on the inner sides of the ionization chamber 202 and the second conductor 306 are electrically connected to each other and an one side in which the second conductor 306 is provided and the opened one side of the ionization chamber 202 are coupled to face each other, so that the opened one side of the ionization chamber 202 may be closed.

Herein, the first conductor 204 provided on the inner sides of the ionization chamber 202 and the second conductor 306 provided on one side of the lid 302 are electrically connected to each other through a coupling portion (C) of the lid 302 and the ionization chamber 202.

The lid 302 may be made of a typical printed circuit board (PCB) having a predetermined thickness, and the entire surface of the printed circuit board (PCB) is covered with a second conductor 306.

In addition, the lid 302 may be further formed with a plurality of holes 304 that causes the air to enter or exit the ionization chamber 202. Each of the holes 304 formed in the lid 302 may vary in diameter and number depending on the volume of the ionization chamber 202.

For example, when the volume of the ionization chamber 202 is 100 cc, the diameter thereof is preferably made in the range of about 0.2 mm to 0.3 mm, and the number thereof is preferably about 6 to 10.

Herein, the diffusion time required for the introduction of external air into the ionization chamber 202 is about 5 to 10 minutes. Accordingly, in the case of Thoron (Rn-220) with a half-life of about 55.6 seconds, since it takes about five or more half-lives, its concentration is reduced to less than $\frac{1}{25}$. Accordingly, the interference of Thoron (Rn-220) is naturally excluded.

In addition, since large dusts cannot be introduced due to holes 304 of small size, it is not necessary to use a separate dust filter. In addition, since the open space of the ionization chamber 202 is minimized, the probability of causing measurement error due to electromagnetic noise infiltration is significantly reduced, compared to the cylindrical ionization chamber having a plurality of holes in the related art.

Meanwhile, when the lid 302 is made of a printed circuit board (PCB), each hole 304 is preferably implemented as a pinhole of a small defect or a small hole that passes through a film such as a metal deposition film or an insulating film.

The probe 402 is made of a conductive material to absorb ionic charges generated when alpha decay occurs due to a radon (Rn-222) nuclide, etc. in the ionization chamber 202, and is disposed in the ionization chamber 202 to perform a function of absorbing ionic charges generated when alpha (α) decay occurs in the ionization chamber 202.

That is, the probe 402 may be provided to detect the ion charges generated by the collision of air and the alpha particles generated when the alpha (α) decay occurs in the ionization chamber 202. The probe 402 is preferably provided to detect alpha particles generated when alpha decay occurs due to radon (Rn-222) in the air introduced into the ionization chamber 202, but the present invention is not limited thereto and may be provided to detect all radioactive gases released as the alpha particles.

In addition, according to an embodiment, the probe 402 is formed in a T-shape as shown in FIGS. 5 and 6, and is preferably disposed in the center portion of the ionization chamber 202.

That is, the probe 402 is formed with a T-shape in vertical coupling between a first probe 402a and a second probe 402b of a rod shape or a straight shape having a predetermined length, in which one end of the first probe 402a passes through the lid 302 and is electrically connected to the measurement circuit unit 504, and the other end thereof is disposed at the center portion of the ionization chamber 202.

In addition, the central portion of the second probe 402b is vertically coupled to the other end of the first probe 402a, and are arranged in the center portion of the ionization chamber 202 so that the distance between each inner surface of the ionization chamber 202 and the periphery of the second probe 402b are the same.

In addition, the probe 402 may be configured in the form of a typical outdoor TV antenna, and is preferably disposed in the center portion of the ionization chamber 202.

That is, the probe 402 is provided in coupling between the first probe 402a of T-shape and the second probe 402b having a predetermined pattern shape, in which the first probe 402a may be configured in the same form as the probe 402 described above. That is, the first probe 402a has an upper head portion which is disposed at the center of the ionization chamber 202 in a rod or straight shape having a constant length, and a lower leg portion which is a rod or straight shape having a constant length, in which one end thereof is vertically coupled to the center of the upper head to form a T-shape, and the other end thereof is electrically connected to the measuring circuit unit 504 through the lid 302.

In addition, the second probe 402b is a rod or straight shape having a constant length, in which a center portion thereof is coupled to the upper head of the first probe 402a to be longitudinally spaced at a predetermined distance, and multiple second probes are connected on the same plane as the upper head of the first probe 402a in a direction perpendicular to the length of the upper head of the first probe 402a and multiple second probes are connected to be oblique at a predetermined angle θ (preferably between about 1 degree and 90 degrees).

In addition, the probe 402 is provided in coupling of the first probe 402a of T-shape and the second probe 402b having a predetermined pattern shape, in which the first probe 402a has an upper head portion which is disposed at the center of the ionization chamber 202 in a rod or straight shape having a constant length, and a lower leg portion which is a rod or straight shape having a constant length, in which one end thereof is vertically coupled to the center of the upper head to form a T-shape, and the other end thereof is electrically connected to the measuring circuit unit 504 through the lid 302.

In addition, multiple second probes 402b are combined in the form of a grid pattern to be perpendicular to each other while crossing each other vertically and horizontally, in which the central portion thereof is longitudinally connected to the upper head of the first probe 402a.

In addition, the grid pattern shape of the second probe 402b may be in the form of a square grid pattern in which multiple second probes are coupled to be perpendicular to each other while crossing each other vertically and horizontally on the same plane as the top head of the first probe 402a, and may be in the form of a lozenge grid pattern. In addition, it may be formed in various forms such as orthogonal lattice pattern, regular hexagonal lattice pattern, or deformed lattice pattern.

That is, the probe 402a or 402b is advantageous in the form of a T-shaped or outdoor TV antenna, rather than a straight probe generally used in an ionization chamber of a cylindrical structure in the related art. The reason is because when the straight probe is applied to the polyhedral ionization chamber 202, the distance between the inner wall and the probe 402a or 402b is long and not constant, making it difficult to maintain a strong electric field in the space of the ionization chamber 202.

Therefore, it is necessary to distribute high electric field intensity near the probe 402a or 402b while keeping the distance between the inner wall of the ionization chamber 202 and the probe 402a or 402b as close as possible. When designing the probe 402a or 402b in the form of a T-shaped or outdoor TV antenna according to embodiments of the present invention, the distance between the probe 402a or 402b and the inner wall of the ionization chamber 202 is closer and the electric field near the probe 402a or 402b are higher, thereby increasing the absorption efficiency and thus increasing the measurement efficiency when the ion charges are generated.

That is, the probe 402a or 402b is designed to be disposed within the ionization chamber 202 to cause the distance between each inner side of the ionization chamber 202 and the peripheral portion of the probe to be the same, so that the distance between the peripheral portion of the probe 402a or 402b and each wall inside the ionization chamber 202 is constant and close to each other and at the same time, the electric field strength near the probe 402a or 402b is also increased, thereby increasing the absorption efficiency and effectively increasing the measurement efficiency when generating ion charges.

The probe 402a or 402b configured as described above is electrically connected to the measurement circuit unit 504 through the lid 302.

Further, the measurement circuit unit 504 performs a function of outputting an alpha particle detection signal by amplifying and processing an electric micro signal input from the probe 402a or 402b in a predetermined size.

The measurement circuit unit 504 is preferably provided on the other side of the lid 302, and is electrically connected to the second conductor 306 provided on one side of the lid 302 through the bias voltage output unit 502 that outputs the bias power supply 10.

In addition, the measurement circuit unit 504 is configured to include, as shown in FIG. 7, a guard ring 510, a noise detector 520, a first preamplifier 530, a second preamplifier 540, and/or a differential amplifier 550.

Here, the guard ring 510 is made of a cylindrical conductive material, is installed so that the probe 402a or 402b passes therethrough, and absorbs the leakage current generated between the ionization chamber 202 and the probe 402a or 402b to flow the same to the ground.

When the guard ring 510 is not provided, the current signal obtained from the probe 402a or 402b and the leakage current signal are combined, thereby causing a problem that the signal-to-noise ratio (SNR) becomes poor.

The noise detector 520 is connected between the guard ring 510 and the ground and performs a function of maintaining the potential of the guard ring 510 slightly higher than the ground to cause DC current leakage current generated between the ionization chamber 202 and the probe 402a or 402b to flow to the ground side, and detecting AC noise to cause the same to output to the second preamplifier 540 described later.

The noise detector 520 is preferably configured by electrically connecting at least one active element of, for example, a resistor, a condenser, and a diode in series, in parallel, and/or a combination of series and parallel.

The first preamplifier 530 is connected to the other end of the probe 402a or 402b, and performs a function of amplifying the electric minute signal input from the probe 300 or 300' to a predetermined size.

The second preamplifier 540 is connected to the output terminal of the noise detector 520, and performs a function of amplifying the electric minute signal input from the noise detector 520 to a predetermined size.

The differential amplifier 550 has a non-inverting terminal (+) and an inverting terminal (−) thereof connected to output terminals of the first preamplifier 530 and the second preamplifier 540, respectively, and performs amplification in proportion to the voltage difference of the electrical signals pre-amplified from the first preamplifier 530 and the second preamplifier 540, thereby effectively cancelling the noise signal and outputting the alpha particle detection signal.

That is, when the differential amplification is performed through the differential amplifier 550, it is possible to effectively cancel the noises having the same phase flowing through the probe 402a or 402b and the noise detector 520, and it is possible to accurately and quickly obtain the alpha particles detection signal of high sensitivity and low noise.

In addition, the electromagnetic wave protection cap 602 is installed to cover the entire particle detection module 504 on the other side of the lid 302, and is made of a conductive material to prevent signal disturbance of the alpha particle detection module 504 by external electromagnetic noise. The electromagnetic wave protection cap 602 is preferably installed to be electrically connected to the ground of the alpha particle detection module 504.

Meanwhile, although not shown in the drawings, the measurement circuit unit 504 further includes a control means (for example, MCU) that counts alpha particle detection signal (for example, pulse signal) output from the differential amplifier 550 every 10 minutes for one hour, and calculates an average value of the remaining radon concentration values excluding a maximum and minimum values among the measured radon concentration values to determine the same as a final radon concentration value, and transmits the determined final radon concentration value in real time to the cloud server (100 in FIG. 1) through wired or wireless communication.

According to the present invention as described above, it is possible to provide a billing system based on radon pattern analysis and a method therefor, which provides users with the radon monitoring service and charges users for the radon monitoring service, by using the radon sensor device using a polyhedral ionization chamber that is excellent in mountability and mass-productivity and eliminates Thoron (Rn-220) interference.

In addition, FIG. 8 is a flowchart illustrating a billing method using a billing system based on radon concentration pattern analysis according to an embodiment of the present invention.

According to the billing method using the billing system based on radon concentration pattern analysis according to the present invention, in order to receive the radon monitoring service through the multiple radon detection devices 200 disposed in the indoor space in which multiple users reside, the user installs the radon monitoring service application into the user terminal 300 and then executes the same. (Step S110). Herein, the user may access the cloud server 100 using the user terminal 300 and thus download the radon monitoring service application.

The user inputs the user information about a type of the user (for example, purchase customer, rental customer), purchase date, rental date, rental period, etc. using the user terminal 300 (step S120). Here, the user is a customer who purchases or rents the radon detection device 200, and may be registered in the user database of the cloud server 100.

In addition, in step S120, the user may input the information about a payment means for paying radon monitoring service costs using the user terminal 300 and the user payment information including some or all of payment methods.

In step S130, the user information input by using the user terminal 300 is transferred to the cloud server 100. Other necessary information may be delivered along with the user information.

In step S140, the cloud server 100 stores the user information received from the user terminal 300 in the memory by matching the same to the identification information of the radon detection device 200 that the user purchases or rents.

Then, when the user turns on an operation of the radon detection device 200 disposed in the indoor space (step S150), the radon detection device 200 outputs an alpha particle detection signal by absorbing ionic charges generated when alpha (a) decay occurs in the radon gas present in the indoor space, calculates the radon concentration value by counting the output alpha particle detection signals for a preset measurement time, and transmits the same to the cloud server 100 through a communication network in real time (step S160).

In step S160, the radon detection device 200 detects the detection time information at a time point when the radon detection device 200 counts the alpha particle detection signal, the identification information of the radon detection device 200, and the location information of the radon detection device 200, and then transmits the same along with the radon concentration value to the cloud server 100.

In step S170, the cloud server 100 may generate the radon concentration value collected from the radon detection device 200, the detection time information at time point when the radon detection device 200 counts the alpha particle detection signal, the identification information of the radon detection device 200, and the radon concentration pattern corresponding to the radon detection device 200 purchases or rents for each user by using the location information of the radon detection device 200. The radon concentration pattern is composed of a time axis (horizontal axis) and a radon concentration axis (vertical axis) as shown in FIGS. 3A and 3B. Here, the radon concentration pattern is generally the highest in the evening and dawn and lower during the day, but the radon concentration value is rapidly decreased at a time point when user's ventilation actions occur such as opening a window or operating radon reduction equipment disposed in the indoor space.

In step S180, the cloud server 100 analyzes the radon concentration pattern generated in step S170. Here, the cloud server 100 may determine a periodic behavior pattern of the user. The periodic behavior pattern of the user means a pattern for the user's ventilation action that is to reduce the radon concentration value of the radon gas present in the indoor space.

For example, the user does activities out of the indoor space during the day, and does activities in the indoor space at evening and dawn. Therefore, ventilation actions are frequently performed, including the user's behavior of opening a window in the indoor space or the user's behavior of operating the radon reduction equipment disposed in the indoor space. Accordingly, the cloud server 100 analyzes the radon concentration pattern generated by using the radon concentration values collected from the radon detection device 200, and detects a time point when the radon concentration value decreases rapidly, thereby determining a periodic behavior pattern for a predetermined period of time. That is, in step S180, the cloud server 100 may determine the periodic behavior pattern and calculate the number of occurrences of a user's ventilation action for a predetermined period of time.

In step S190, the cloud server 100 calculates a cost for the radon monitoring service provided to the user terminal 300 on the basis of the user's periodic behavior pattern determined in step S180 and the user information stored in step S140, and then charges the user who owns the user terminal 300 for the radon monitoring service. In step S200, the cloud server 100 may transmit a charging performance result (for example, payment information, receipt, etc.) to the user terminal 300 through a push message.

A detailed content of the step in which the cloud server 100 charges the user in step S190 will be described with reference to FIG. 9. FIG. 9 is a flowchart illustrating step S190 in which the cloud server of FIG. 8 performs a charging function.

Referring to FIG. 9, in step S191, the cloud server 100 checks user information stored in a memory unit through identification information of the radon detection device received from the radon detection device 200.

In step S192, the cloud server 100 may determine whether or not the user information indicates a user who purchased the radon detection device 200.

When, as a result of the determination of the cloud server 100 in step S192, the user information indicates a user who purchased the radon detection device 200, the user may be charged for the radon monitoring service after calculating the cost for the radon monitoring service provided to the terminal 300 of the user on the basis of the number of occurrences of a user's ventilation action calculated in step S180 for a predetermined period of time.

Herein, the cloud server 100 may calculate the cost that is to be charged to the user for the radon monitoring service, through the billing information database that stores the information of the user using the radon detection device 200 and the billing information according to the number of occurrences of the ventilation action calculated in step S180. Here, the higher number of occurrences of the user's ventilation action calculated in step S180, the less the cloud server 100 may set a cost for the radon monitoring service. As such, since the user can benefit from the reduced cost of using the radon monitoring service according to the number of the occurrences of a user's ventilation action, the user may be motivated to frequently perform the ventilation action to reduce the radon concentration.

As a result of the determination of the cloud server 100 in step S192, when it is determined that the user is not the user who purchased the radon detection device 200, it is determined that the information of the user indicates a user who rents the radon detection device 200 (S194).

In step S195, the cloud server 100 calculates the cost that is to be charged to the user for the radon monitoring service through a billing information database that stores the billing information according to the rental period for which the radon detection device 200 is rent, thereby charging the user for radon monitoring services.

As described above, the charging method based on radon concentration pattern analysis according to the present invention may differently charge users for the radon monitoring service according to a type of the user (purchase customer, rental customer) using the radon monitoring service.

In addition, when it is determined that the user's ventilation action has occurred at a time point when the radon concentration is sharply reduced during a predetermined period of time, on the basis of the radon concentration pattern analysis, the number of occurrences of a user's ventilation action is calculated, whereby it is possible to charge the user who rents the radon detection device 200 for the radon monitoring service, on the basis of the calculated number of occurrences of a user's ventilation action. Thus, the user may be motivated to frequently perform the ventilation action that reduces the radon concentration, through the billing method based on the radon concentration pattern analysis according to the present invention.

DESCRIPTION OF REFERENCE NUMBERS

100: cloud server
200, 200a, 200b: radon detection device
300: user terminal
110: data collection unit
120: memory unit
130: pattern generation unit
140: pattern determination unit
150: billing unit

The invention claimed is:

1. A billing system based on a radon concentration pattern analysis, the system comprising:
   a radon detection device absorbing ionic charges generated when alpha (a) decay occurs in radon gas present in an indoor space to output alpha particle detection signals, and counting the output alpha particle detection signals for a predetermined measurement time to calculate a radon concentration value and transmit the same in real time through a communication network; and
   a cloud server storing information of a user using the radon detection device, generating a radon concentration pattern corresponding to the radon detection device by using a radon concentration value received from the radon detection device, analyzing the generated radon concentration pattern to determine a periodic behavior pattern of the user, and calculating a cost for radon monitoring service provided to a terminal of the user on the basis of the determined periodic behavior pattern of the user and the user information and then charging the user for the radon monitoring service, the periodic behavior pattern of the user meaning a pattern for user's ventilation actions to reduce the radon concentration value of the radon gas present in the indoor space,
   wherein the cloud server analyzes the generated radon concentration pattern, detects within a predetermined period of time a plurality of time points when the radon concentration value decreases rapidly, and determines that a respective ventilation action has occurred at each of the plurality of time points;
   wherein the cloud server calculates the cost for the radon monitoring service provided to the terminal of the user based on a number of occurrences of the ventilation action during the predetermined period of time to charge the user for the radon monitoring service; and
   wherein the greater the number of occurrences of the ventilation action determined by the cloud server for the predetermined period of time, the less the cloud server sets the cost for the radon monitoring service provided to the user.

2. The system of claim 1, wherein the radon detection device includes:
   an alpha particle detection module absorbing ion charges generated when alpha (a) decay occurs in the radon gas contained in the air introduced into an ionization chamber of a predetermined size, to output the alpha particle detection signals through signal processing; and
   a control module counting the alpha particle detection signals output by the alpha particle detection module every 10 minutes for one hour to calculate an average value of remaining radon concentration values except maximum and minimum values among the measured radon concentration values and determine the same as a final radon concentration value, and performing control so that the determined final radon concentration value is transmitted in real time to the cloud server using wired or wireless communication.

3. The system of claim 1, wherein the radon detection device includes:
 a polyhedral ionization chamber having one side opened and an inner side surrounded by a first conductor and forming an electric field therein by applying a bias power to the first conductor;
 a lid having one side covered with a second conductor and closing the opened one side of the ionization chamber so that the first conductor provided on an inner side of the ionization chamber and the second conductor are electrically connected to each other;
 a probe disposed in the ionization chamber to absorb ion charges generated when alpha ($\alpha$) decay occurs in the ionization chamber; and
 a measurement circuit unit outputting the alpha particle detection signals by amplifying and processing an electric micro signal input from the probe to a predetermined size.

4. The system of claim 2, further comprising:
 a time measurement module generating detection time information at a time point when the alpha particle detection signals output by the alpha particle detection module is counted;
 a GPS module collecting location information of the radon detection device; and
 a storage module storing the detection time information generated by the time measurement module and the location information of the radon detection device collected by the GPS module by matching the same to the final radon concentration value calculated by the control module,
 wherein the control module performs control so that the detection time information generated from the time measurement module and the location information of the radon detection device collected from the GPS module are transmitted to the cloud server in real time.

5. The system of claim 2, wherein the radon detection device transmits the determined final radon concentration value and identification information of the radon detection device to the cloud server in real time through the communication network.

6. The system of claim 1, wherein the cloud server includes:
 a data collection unit collecting identification information of the radon detection device, location information of the radon detection device, detection time information at a time point when the alpha particle detection signals are counted, and the radon concentration value from the radon detection device;
 a memory unit storing the identification information of the radon detection device collected by the radon detection device, the location information of the radon detection device, the detection time information, and the radon concentration value by matching the same with the information of the user using the radon detection device unit;
 a pattern generation unit generating a radon concentration pattern corresponding to the radon detection device for each user, by using the radon concentration value collected from the radon detection device through the data collection unit, the identification information of the radon detection device, the location information of the radon detection device, the detection time information, and the user information;
 a pattern determination unit analyzing the radon concentration pattern generated by the pattern generation unit and determining that each ventilation action has occurred at a respective time point when the radon concentration value drastically decreases, to calculate the number of occurrences of the ventilation action during the predetermined period of time; and
 a billing unit calculating the cost for the radon monitoring service provided to the user terminal on the basis of the information of the user using the radon detection device and the number of occurrences of the ventilation action determined by the pattern determination unit for the predetermined period of time and then charging the user for the radon monitoring service.

7. The system of claim 6, wherein the billing unit includes:
 a billing information database storing the information of the user using the radon detection device and the billing information according to the number of occurrences of the ventilation action determined by the pattern determination unit; and
 a billing calculation module calculating the cost for the radon monitoring service provided to the user on the basis of the information of the user using the radon detection device and the number of occurrences of the ventilation action calculated by the pattern determination unit for the predetermined period of time by using the billing information confirmed through the billing information database and then charging the user for the radon monitoring service provided to the user terminal.

8. The system of claim 6, wherein the billing unit calculates the cost for the radon monitoring service according to a rental period for which the radon detection device is rented to charge the user for the radon monitoring service, when the information of the user using the radon detection device identified through the memory unit is found to be a user who rents the radon detection device.

9. The system of claim 6, wherein the billing unit calculates the cost for the radon monitoring service provided to the terminal of the user on the basis of the number of occurrences of the ventilation action calculated by the pattern determination unit for the predetermined period of time to charge the user for the radon monitoring service, when the information of the user using the radon detection device identified through the memory unit is found to be a user who purchases the radon detection device.

10. The system of claim 9, wherein the greater the number of occurrences of the ventilation action determined by the pattern determination unit for the predetermined period of time, the less the billing unit sets the cost for the radon monitoring service provided to the user.

11. A billing method based on radon concentration pattern analysis of a cloud server providing radon monitoring service to a user terminal, the method comprising:
 by the cloud server, storing identification information of a radon detection device corresponding to each of multiple radon detection devices and information of a user who uses the radon detection device, in a memory unit;
 by the cloud server, receiving a radon concentration value from the radon detection device;
 by the cloud server, generating a radon concentration pattern corresponding to the identification information of the radon detection device using the radon concentration value received from the radon detection device;
by the cloud server, determining a user's periodic behavior pattern by analyzing the generated radon concentration pattern, detecting within a predetermined period of time a plurality of time points when the radon concentration value decreases rapidly, and determining that a respective ventilation action has occurred at each of the plurality of time points; and
by the cloud server, calculating a cost for the radon monitoring service provided to the user terminal based on a number of occurrences of the ventilation action during the predetermined period, and charging the user for the radon monitoring service,
wherein the determining of the user's periodic behavior pattern user includes:
analyzing the generated radon concentration pattern and detecting within a predetermined period of time a plurality of time points when the radon concentration value decreases rapidly, and determining that a respective ventilation action has occurred at each of the plurality of time points;
determining a number of occurrences of the ventilation action based on the plurality of time points;
wherein the charging of the user for the radon monitoring service includes:
calculating the cost for the radon monitoring service provided to the user terminal on the basis of a number of occurrences of the ventilation action during the predetermined period of time and charging the radon monitoring service to the user; and
wherein in the charging of the user for the radon monitoring service, the greater the number of occurrences of the ventilation action for the predetermined period of time, the less the user is charged the cost for the radon monitoring service.

12. The method of claim 11, further comprising, before receiving the radon concentration value from the radon detection device:
by the radon detection device, absorbing ion charges generated when alpha (α) decay occurs in the radon gas present in the indoor space in which the radon detection device is disposed to output alpha particle detection signals; and
by the radon detection device, counting the output alpha particle detection signals every 10 minutes for one hour to calculate an average value of remaining radon concentration values except maximum and minimum values among the measured radon concentration values and determine the same as a final radon concentration value, and transmitting the determined final radon concentration value to the cloud server in real time through a communication network.

13. The method of claim 12, wherein the transmitting of the determined final radon concentration value to the cloud server time through the communication network includes:
transmitting the determined final radon concentration value and the identification information of the radon detection device to the cloud server in real time through the communication network.

14. The method of claim 11, wherein the determining of the user's periodic behavior pattern includes analyzing the generated radon concentration pattern to determine that each ventilation action occurs at a respective time point when the radon concentration value drastically decreases, and calculating the number of occurrences of the ventilation action user for during the predetermined period of time.

15. The method of claim 11, wherein the charging of the user for the radon monitoring service includes:
checking whether the information of the user using the radon detection device identified through the memory unit is a user who rents the radon detection device or a user who purchases the radon detection device; and
as a result of the checking, calculating the cost for the radon monitoring service according to a rental period for which the radon detection device is rented to charge the user for the radon monitoring service, when the information of the user using the radon detection device identified through the memory unit is found to be a user who rents the radon detection device.

* * * * *